US011872682B2

(12) United States Patent
Takata et al.

(10) Patent No.: US 11,872,682 B2
(45) Date of Patent: Jan. 16, 2024

(54) PORTABLE POWER TOOL

(71) Applicant: MAKITA CORPORATION, Anjo (JP)

(72) Inventors: Tomoki Takata, Anjo (JP); Katsumi Okouchi, Anjo (JP); Takuji Kimura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 56 days.

(21) Appl. No.: 17/363,487

(22) Filed: Jun. 30, 2021

(65) Prior Publication Data

US 2022/0009073 A1 Jan. 13, 2022

(30) Foreign Application Priority Data

Jul. 13, 2020 (JP) ................................ 2020-120213

(51) Int. Cl.
*B25F 5/02* (2006.01)
*B24B 23/04* (2006.01)

(52) U.S. Cl.
CPC ................ *B25F 5/02* (2013.01); *B24B 23/04* (2013.01)

(58) Field of Classification Search
CPC .................................. B25F 5/02; B25F 5/024
See application file for complete search history.

(56) References Cited

U.S. PATENT DOCUMENTS 4,625,462 A 12/1986 Fushiya et al.
9,061,393 B2 6/2015 Sugita et al.
9,114,500 B2 * 8/2015 Sugita ..................... B24B 23/03
10,632,589 B2 * 4/2020 Fisher ..................... B24B 23/02
2013/0165026 A1 6/2013 Sugita et al.
2016/0199962 A1 * 7/2016 Tan .......................... B25F 5/02 451/344

(Continued)

FOREIGN PATENT DOCUMENTS

JP S6161761 A 3/1986
JP 2009166147 A 7/2009

(Continued)

OTHER PUBLICATIONS

Dewalt DCW210 Instruction Manual (Year: 2018).*
Unpublished U.S. Appl. No. 17/374,305.

*Primary Examiner* — Daniel Jeremy Leeds
(74) *Attorney, Agent, or Firm* — J-TEK LAW PLLC; Jeffrey D. Tekanic; Scott T. Wakeman

(57) ABSTRACT

A portable power tool includes a first handle extending in an elongated manner and configured to be held by a user, an electric motor, a tool accessory that undergoes orbital and/or rotational motion in response to generation of a rotational driving force by the electric motor, and a battery mounting part configured to detachably attach a battery that serves as a power source for the electric motor. The battery mounting part includes an upward mounting surface on which the battery is mountable, and at least one terminal configured to be electrically connected to the battery when a surface of the battery that includes a connection interface is placed on the mounting surface. The mounting surface is located at a position different from the first handle in the front-rear direction, and is located below an upper side of the first handle in the up-down direction.

25 Claims, 11 Drawing Sheets

(56) References Cited

U.S. PATENT DOCUMENTS

| | | | | |
|---|---|---|---|---|
| 2019/0070705 | A1 | 3/2019 | Ishikawa | |
| 2021/0197356 | A1* | 7/2021 | Chung .................... | B25F 5/008 |

FOREIGN PATENT DOCUMENTS

| | | | |
|---|---|---|---|
| JP | 2013129014 | A | 7/2013 |
| JP | 2013129015 | A | 7/2013 |
| JP | 2013129016 | A | 7/2013 |
| JP | 2014148024 | A | 8/2014 |
| JP | 2019042891 | A | 3/2019 |
| WO | 2018168421 | A1 | 9/2018 |

* cited by examiner

A-A

PORTABLE POWER TOOL

CROSS-REFERENCE TO RELATED APPLICATION

The present application claims priority to Japanese patent application no. 2020-120213 filed on Jul. 13, 2020, the contents of which are hereby fully incorporated herein by reference.

TECHNICAL FIELD

The present disclosure relates to portable (e.g., hand-held) power tools having a tool accessory that orbits and/or rotates to perform a processing operation on a workpiece or surface, such as sanding, abrading, polishing or grinding.

BACKGROUND

Some known portable (hand-held) power tools, such as sanders, have an electric motor, a battery (rechargeable battery pack) serving as a power source of the electric motor, and a handle that extends in an elongated manner in a horizontal direction. For example, WO 2018/168421 discloses a sander having an elongated main handle on one side of an electric motor and a battery on the other side of the electric motor. In addition, an auxiliary handle is arranged on the other side in such a manner as to oppose or face three sides of the battery. The auxiliary handle is configured to be pivotable between a retracted position for permitting attachment and detachment of the battery and a holding position for being held (gripped) by a user during a sanding/abrading operation.

SUMMARY

According to one non-limiting, representative aspect of the present disclosure, a portable (hand-held) power tool may include a first handle extending in an elongated manner and configured to be held by a user, an electric motor, a tool accessory configured to undergo orbital and/or rotary motion by utilizing (in response to) a rotational driving force output by the electric motor, and a battery mounting part to which a battery (rechargeable battery pack or cartridge) is attachable to serve as a power source of the electric motor. If the extension direction of the first handle is defined as a front-rear direction, a direction orthogonal to the front-rear direction and in which the first handle and the tool accessory are arranged in series is defined as an up-down direction. In the up-down direction, a first side on which the first handle is located is defined as an upper side, while a second, opposite side on which the tool accessory is located is defined as a lower side. The battery mounting part includes an upward mounting surface (i.e. a mounting surface that faces upward in the up-down direction) on which the battery is mountable, and one or more terminals (e.g., in the form of a terminal block) configured to be electrically connected to the battery when a surface of the battery that includes a connection interface is placed on the upward mounting surface. The upward mounting surface is located at a position different from the first handle such that the upward mounting surface and the first handle do not overlap in the front-rear direction, and is located below an upper end (or uppermost edge or surface) of the first handle in the up-down direction.

Because the upward mounting surface for mounting the battery is located below the upper end (uppermost edge or surface) of the first handle, it is possible to make the portable power tool more compact in the up-down direction with the battery mounted thereon. Here, it is noted that the "upward" mounting surface may extend completely perpendicular to the up-down direction, or it may extend at a non-perpendicular angle with respect to the up-down direction. Such non-perpendicular angle is preferably within the range of 45–89° with respect to the up-down direction, more preferably 60-89°, even more preferably 80-89°.

DETAILED DESCRIPTION OF THE EMBODIMENT

Figure 1:
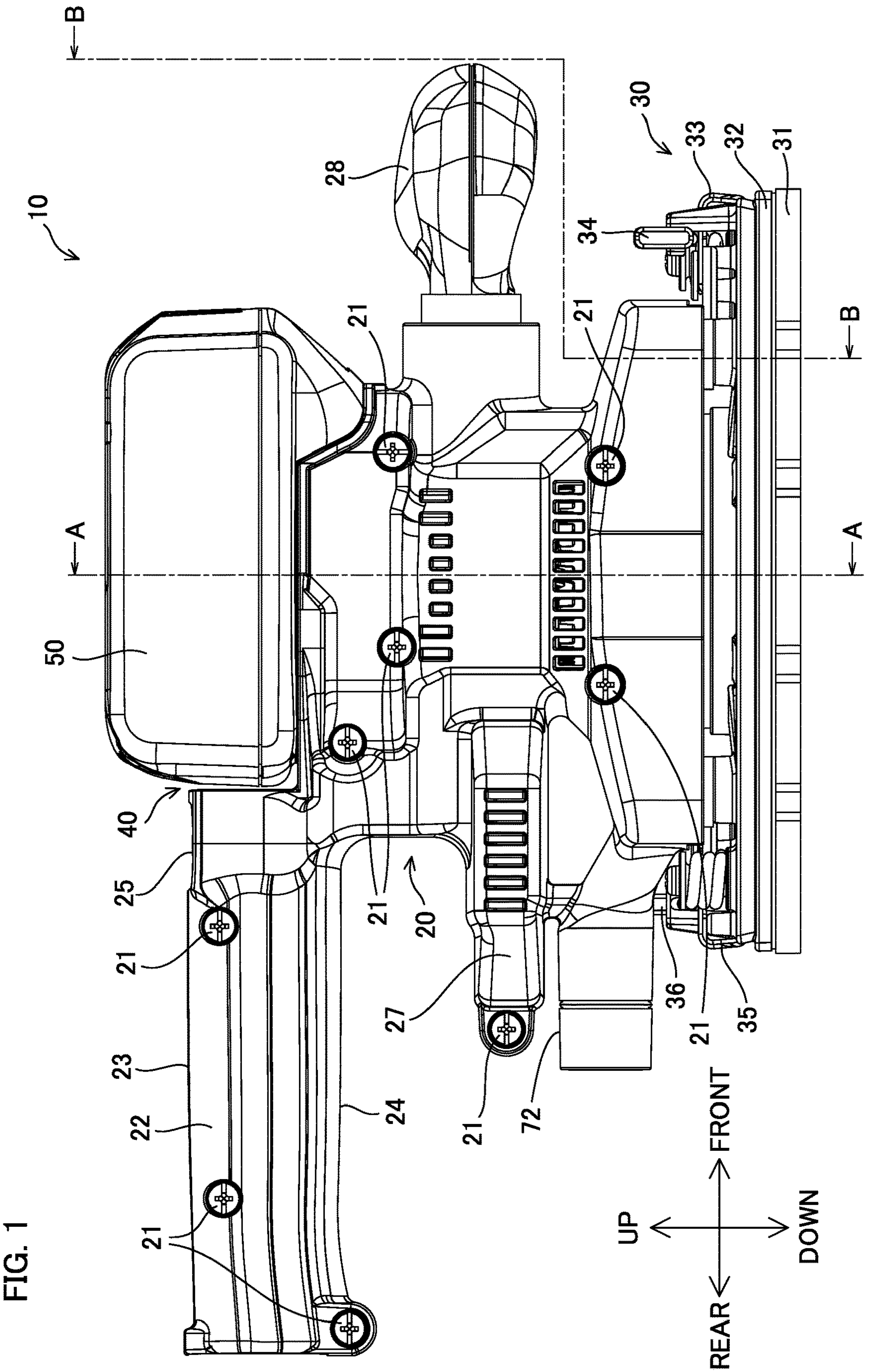
FIG. 1 is a right side view showing a sander according to one representative, non-limiting embodiment of the present disclosure, with a battery mounted thereon.

According to one non-limiting embodiment of the present disclosure, the battery mounting part may be configured such that the battery (e.g., a battery pack or battery cartridge) is mountable by sliding in a direction that forms an angle of 30 degrees or less (within a range of plus/minus 30 degrees) with a horizontal direction that is orthogonal to the up-down direction. According to this embodiment, the portable (e.g., hand-held) power tool is designed such the battery is slid and mounted from any of such directions as to prevent interference with a stepped part formed between the upper end (edge or surface) of the first handle and the mounting surface, so that a high degree of freedom of design is obtained. Thus, the portable power tool can be easily designed such that the battery is slid and mounted from such a direction as to prevent interference with other components of the power tool, while making the portable power tool more compact in the up-down direction.

In addition, the battery mounting part may be configured such that the battery is mountable thereon by being slid in a direction that is orthogonal or at least substantially orthogonal to the up-down direction (that is, in a horizontal or at least substantially horizontal direction, i.e., 30 degrees or less from the horizontal direction). According to this embodiment, the weight of the battery is at least substantially evenly distributed in the horizontal direction and thus applies an even downward force on the tool accessory during a processing operation. Consequently, a uniform processing operation such as sanding, abrading, polishing or grinding can be more easily achieved, as compared to known embodiments in which the battery is mounted on a side wall of the sander or polisher, because the burden on the user to press the power tool with a uniform (even) downward pressure is reduced owing to the at least substantially uniform downward force applied to the tool accessary by the battery itself.

In addition, the electric motor may include a motor shaft extending in the up-down direction. Furthermore, the battery mounting part may be configured to hold the battery above both the tool accessory and the motor shaft in the up-down direction. Owing to this rational arrangement of the components in this embodiment, the size of the power tool can be reduced both in the front-rear direction and in a direction (e.g., a left-right direction) that is orthogonal to the front-rear direction and the up-down direction. Moreover, if the motor shaft is located at or relatively near the center of the tool accessory when viewed in the up-down direction, the relatively heavy battery acts as a load (weight) around the center of the tool accessory. Therefore, the pressing force of the battery that downwardly presses the tool accessory, e.g., against a workpiece, is uniformly or evenly distributed, which means that the workpiece can be uniformly or evenly polished, sanded, abraded, etc. with less burden on the user.

In addition, an upper end of the motor shaft may be located below a lower end (edge or surface) of the first handle in the up-down direction, which enables the size (length) of the power tool to be reduced in the up-down direction.

In addition or in the alternative to the preceding embodiments, the electric motor may be a brushless motor. According to this embodiment, the length of the motor shaft can be reduced, so that the upper end of the motor shaft can be easily arranged below the lower end (edge, surface) of the first handle.

In addition or in the alternative to the preceding embodiments, the portable power tool may include an output shaft arranged in parallel to the motor shaft and configured to transmit the rotational driving force of the motor shaft to the tool accessory. The battery mounting part may be configured to hold the battery above the output shaft. An upper end of the output shaft may be located below the lower end of the first handle in the up-down direction. According to this embodiment, even if the portable power tool includes an output shaft that is separate from the motor shaft, the size (length) of the portable power tool can also be reduced in the up-down direction, in the front-rear direction and in the direction orthogonal to the front-rear direction and the up-down direction, while remaining capable of performing uniform sanding, polishing, grinding, etc.

In addition or in the alternative to the preceding embodiments, the portable power tool may include a controller configured to control operation (energization) of the electric motor. The controller may be located on a side on which the first handle is located with respect to the motor shaft in the front-rear direction, and located below the first handle in the up-down direction. According to this embodiment, the controller can be arranged in a dead space (i.e. an otherwise unused space) below the first handle. Thus, the controller can be arranged without substantially increasing the size of the power tool.

In addition, the largest surfaces (i.e. the surfaces having the largest surface area) of the controller may respectively face upward and downward in the up-down direction. According to this embodiment, the installation space (height) for the controller in the up-down direction can be minimized. Therefore, even if the controller is arranged below the first handle, the controller will not interfere with the user's ability to hold the first handle.

In addition or in the alternative to the preceding embodiments, the portable power tool may include a second handle arranged below the battery mounting part in the up-down direction. According to this embodiment, the user can hold the power tool more stably by holding (grasping) both of the handles (i.e. both of the first handle and the second handle). Furthermore, the second handle does not interfere with attachment and detachment of the battery.

In addition or in the alternative to the preceding embodiments, the tool accessory may have a generally rectangular shape having a longitudinal direction in the front-rear direction when viewed from (in) the up-down direction. When, in the front-rear direction, a first side on which the battery mounting part is located is defined as a front side and a second, opposite side on which the first handle is located is defined as a rear side, the battery mounting part may be configured such that the battery is mounted by sliding from the front to the rear. Although a sliding type mounting mechanism for the battery is required to have a minimum length in the sliding direction, according to this embodiment, the sliding type mounting mechanism is configured such that the battery is slid in the longitudinal direction of the tool accessory, so that the minimum length required for the sliding type mounting mechanism is easily ensured. In other words, it is not necessary to increase the device size (length) in a direction orthogonal to the up-down direction and the front-rear direction only for the purpose of ensuring the required minimum length of the sliding type mounting mechanism.

In addition or in the alternative to the preceding embodiments, the portable power tool may include the battery (battery pack or battery cartridge).

A detailed non-limiting embodiment of the present teachings will now be described in further detail with reference to the drawings. In this embodiment, an orbital sander (hereinafter simply referred to as a sander) 10, which is also known in the art as a finishing sander, will be described as a representative example.

Figure 2:
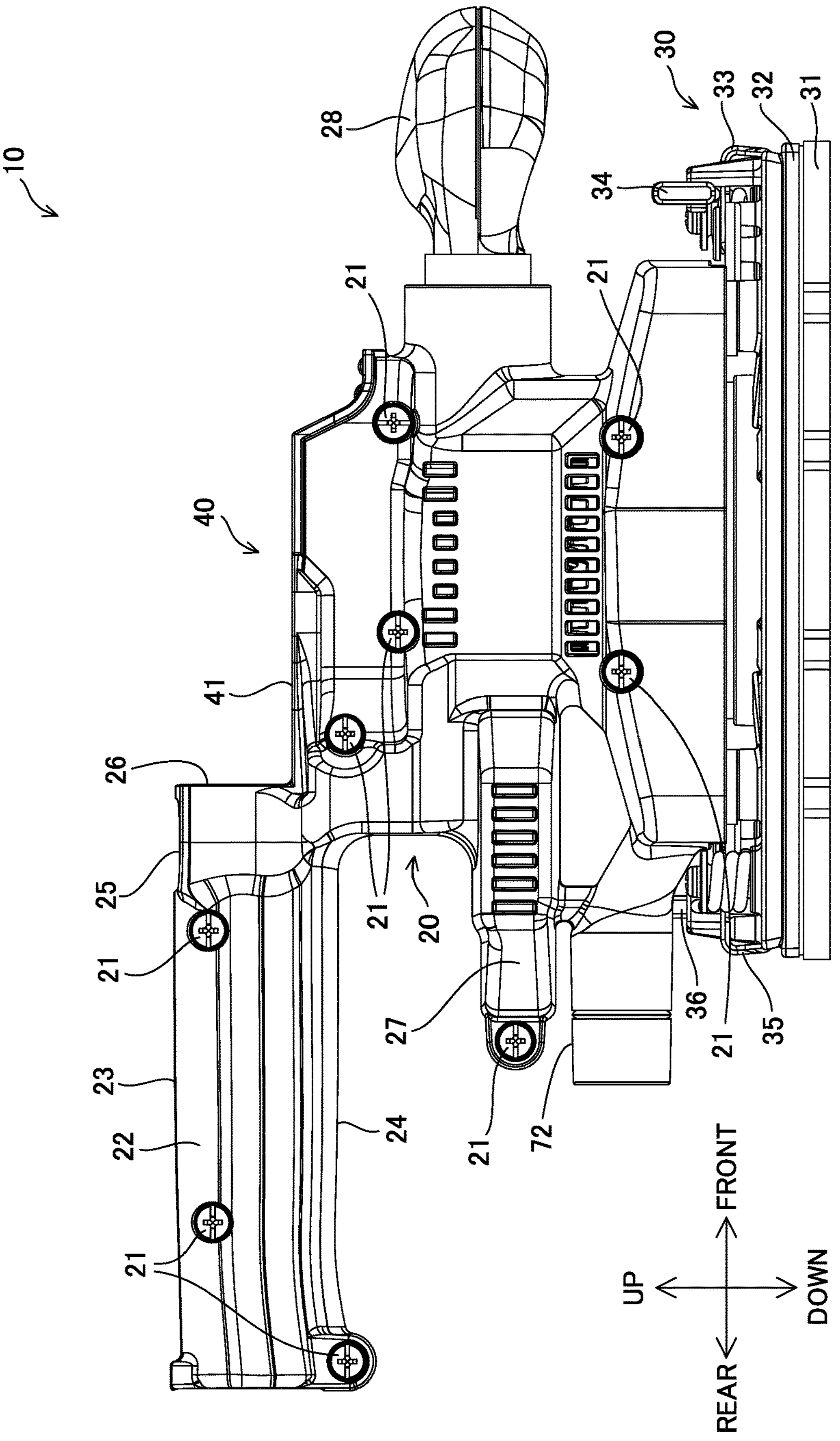
FIG. 2 is a right side view of the sander with the battery detached therefrom.
Figure 3:
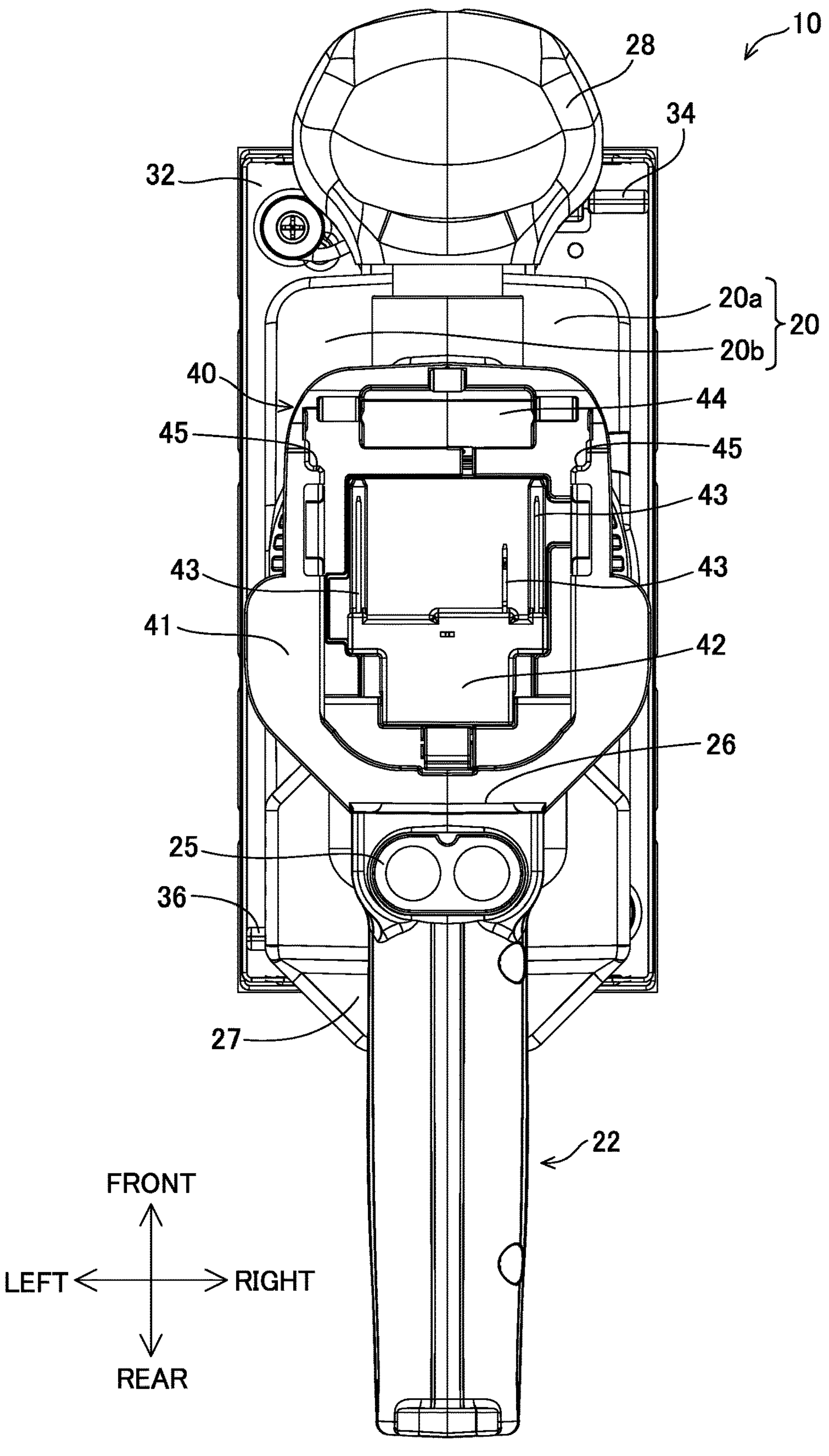
FIG. 3 is a plan view of the sander with the battery detached therefrom.

As shown in FIGS. 1 to 3, the sander 10 includes a first handle 22, a tool accessory (sanding/polishing part) 30 and a battery mounting part (battery mount) 40. The first handle 22 is shaped and sized to be held by a user while using the sander 10 to sand or abrade a workpiece or other surface. The first handle 22 may also be called a main handle. The first handle 22 has a rod-like elongate body. The first handle 22 has a generally constant diameter along its longitudinal direction and includes an upper side (edge) 23 and a lower side (edge) 24. The battery mounting part 40 is arranged contiguously with the first handle 22 in the extension direction of the first handle 22. The sander 10 is configured such that the tool accessory 30 is driven with an orbital motion by utilizing the rotational driving power of an electric motor 60, which will be described in further detail below.

In the following description, the extension direction of the first handle 22 (i.e. the longitudinal direction of the first handle 22) is defined as a front-rear direction of the sander 10. In the front-rear direction, a first side on which the battery mounting part 40 is located is defined as a front side, while a second, opposite side on which the first handle 22 is located is defined as a rear side. A direction orthogonal to the front-rear direction is defined as an up-down direction of the sander 10; the first handle 22 and the tool accessory 30 are arranged in series in the up-down direction. In addition, in the up-down direction, a first side on which the first handle

22 is located is defined as an upper side, while a second, opposite side on which the tool accessory 30 is located is defined as a lower side. Further, a direction orthogonal to both of the front-rear direction and the up-down direction is defined as a left-right direction of the sander 10. In the left-right direction, the right side as viewed from the rear is defined as the right side of the sander 10, and the opposite side is defined as the left side of the sander 10.

As shown in FIGS. 1 to 3, the sander 10 includes a housing 20. The housing 20 includes two halves, or more specifically a right housing half 20*a* and a left housing half 20*b*, which are connected together by bolts 21 (see FIGS. 1 and 2). The first handle 22 is formed as part of the housing 20 on (at) an upper side or edge (more precisely, an upper side in the state in which a battery 50 (described below) is not mounted) and a rear side or edge of the sander 10.

Figure 7:
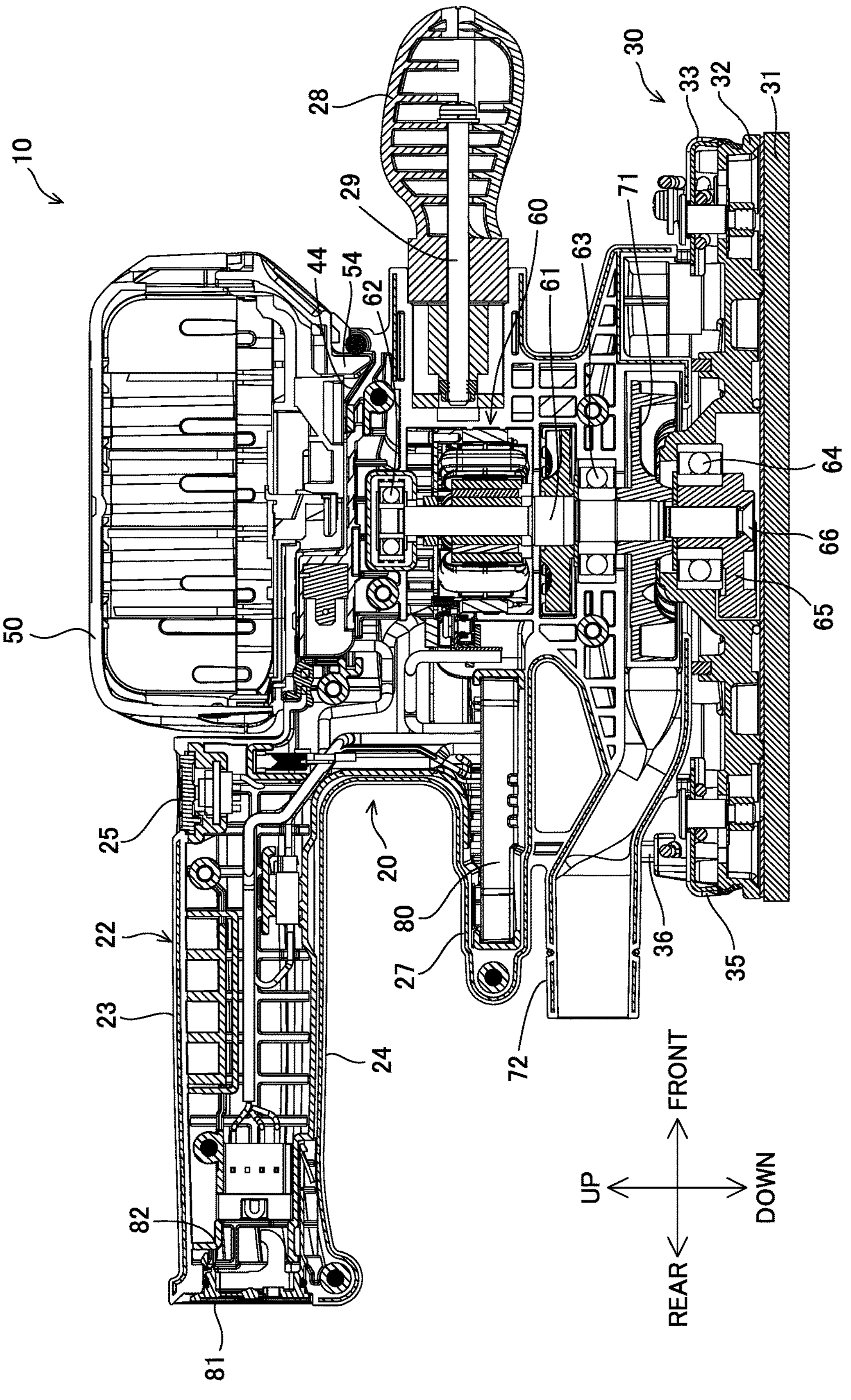
FIG. 7 is a longitudinal sectional view of the sander with the battery mounted thereto.
Figure 8:
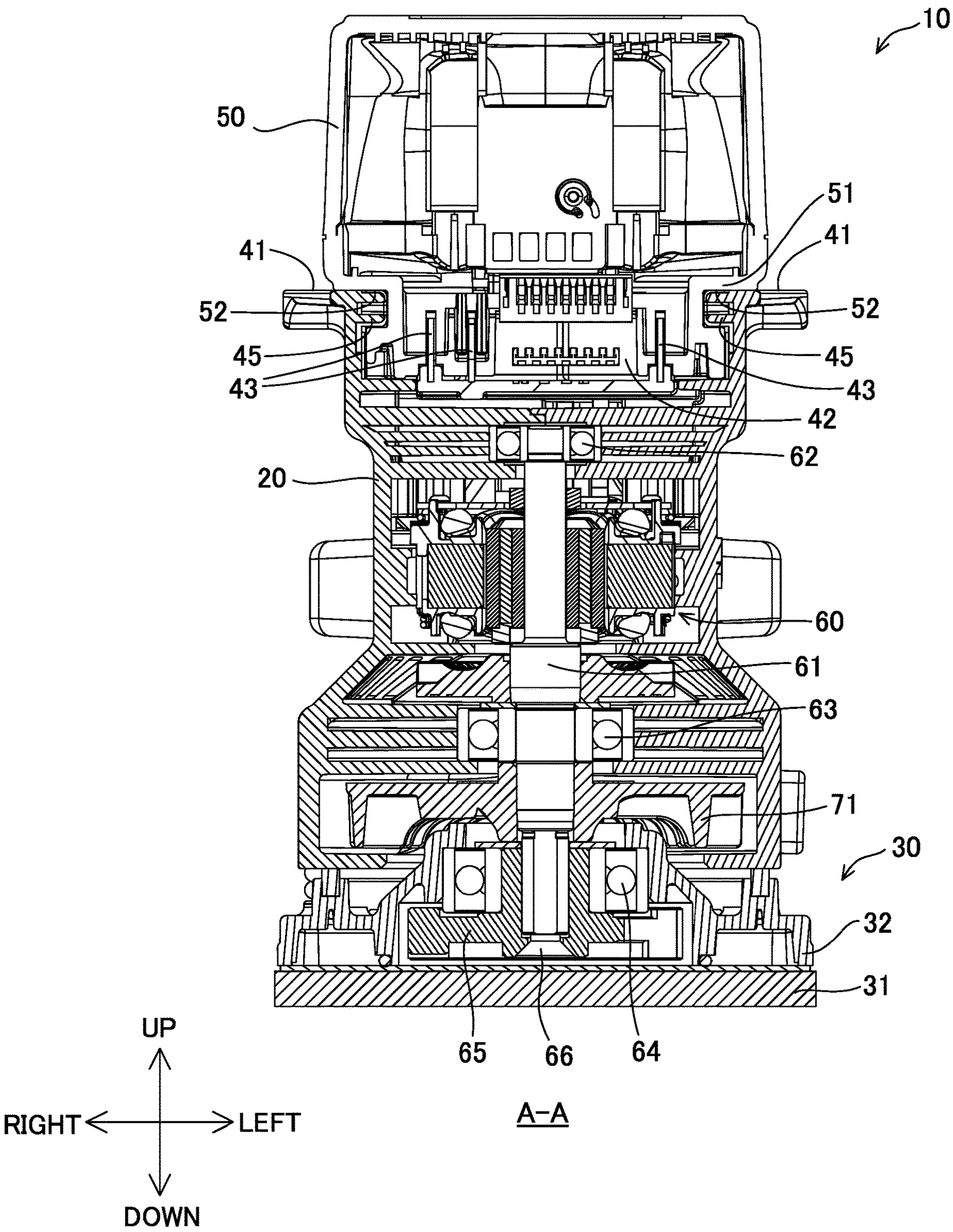
FIG. 8 is a longitudinal sectional view of the sander, taken along line A-A in FIG. 1.

As shown in FIGS. 7 and 8, the electric motor 60 is housed in the housing 20. In this embodiment, the electric motor 60 is a brushless motor, but it may instead be a brushed (commutated) motor. The electric motor 60 includes a motor shaft 61 extending in the up-down direction. The motor shaft 61 is rotatably supported by upper and lower bearings 62, 63, which are fixed to the housing 20. The upper bearing 62 supports an upper end (or upper end portion) of the motor shaft 61, and the lower bearing 63 supports an intermediate portion of the motor shaft 61. The upper end of the motor shaft 61 is located below the lower side 24 of the first handle 22 in the up-down direction. In this embodiment, each of the bearings 62, 63 is a ball bearing. The motor shaft 61 is arranged generally at the center of the tool accessory 30 (described below) when viewed from (in) the up-down direction.

As shown in FIG. 7, a fan 71 is mounted around the motor shaft 61 and underneath the lower bearing 63. A housing space for the fan 71 is in fluid communication with a dust collecting (extraction) nozzle 72. The dust collecting nozzle 72 extends rearward from a lower rear end part of the housing 20. A hose (not shown) can be attached to the dust collecting nozzle 72 and connected to a dust collecting machine or dust extractor/vacuum (not shown).

As shown in FIGS. 1 and 2, the tool accessory 30 is arranged at the lowermost part of the sander 10, and may include, e.g., a pad 31, a base (platen) 32, front and rear dampers (clamps) 33, 35 and front and rear levers 34, 36. The pad 31 and the base 32 have a generally rectangular shape with a longitudinal direction extending in the front-rear direction when viewed from (in) the up-down direction. The base 32 is arranged on top of the pad 31 and they are connected together by bolts or screws 38 (see FIG. 10) extending in the up-down direction.

Sandpaper (abrasive paper) (not shown) is mounted on the pad 31 by utilizing the front and rear dampers 33, 35. Specifically, the front damper 33 extends along a front edge of the base 32 and above the base 32 (see FIG. 5). The front damper 33 is configured to be displaced by manually operating the front lever 34. The rear damper 35 extends along a rear edge of the base 32 and above the base 32 (see FIG. 6). The rear damper 35 is configured to be displaced by manually operating the rear lever 36. In order to fix the sandpaper to the pad 31, the sandpaper is placed on a bottom face of the pad 31. Then, a front end of the sandpaper is clamped between the front damper 33 and the base 32 by manually operating the front lever 34, and a rear end of the sandpaper is clamped between the rear damper 35 and the base 32 by manually operating the rear lever 36. The bottom face of the pad 31 supports the sandpaper during use of the sander 10. In a modified embodiment, the bottom (lower) surface of the pad 31 optionally may have hook-and-loop type fasteners, and the sandpaper may have corresponding hook-and-loop type fasteners for detachably attaching to the hook-and-loop type fasteners of the pad 31. In such a modified embodiment, the dampers 33, 35 and levers 34, 36 may be omitted.

As shown in FIGS. 7 and 8, the tool accessory 30 is operably connected to the motor shaft 61 via an eccentric bearing 64. Furthermore, a balancer (counterweight) 65 is fixed around a lower end portion of the motor shaft 61. The balancer 65 is fixed to the motor shaft 61 by a bolt 66 that is threadedly engaged with (in) a threaded hole formed in the lower end of the motor shaft 61. The eccentric bearing 64 is held between an upper portion of the balancer 65 and the base 32. An inner ring of the eccentric bearing 64 is supported by a lower portion of the balancer 65. The eccentric bearing 64 is arranged eccentrically to the motor shaft 61. The balancer 65 is shaped such that the center of gravity of the balancer 65 is eccentric (offset from the rotational center axis of the motor shaft 61) in a direction opposite to the eccentric direction of the eccentric bearing 64 with respect to the motor shaft 61. This arrangement reduces the amount of vibration caused by the structure, even though the eccentric bearing 64 is eccentric to the motor shaft 61.

Figure 9:
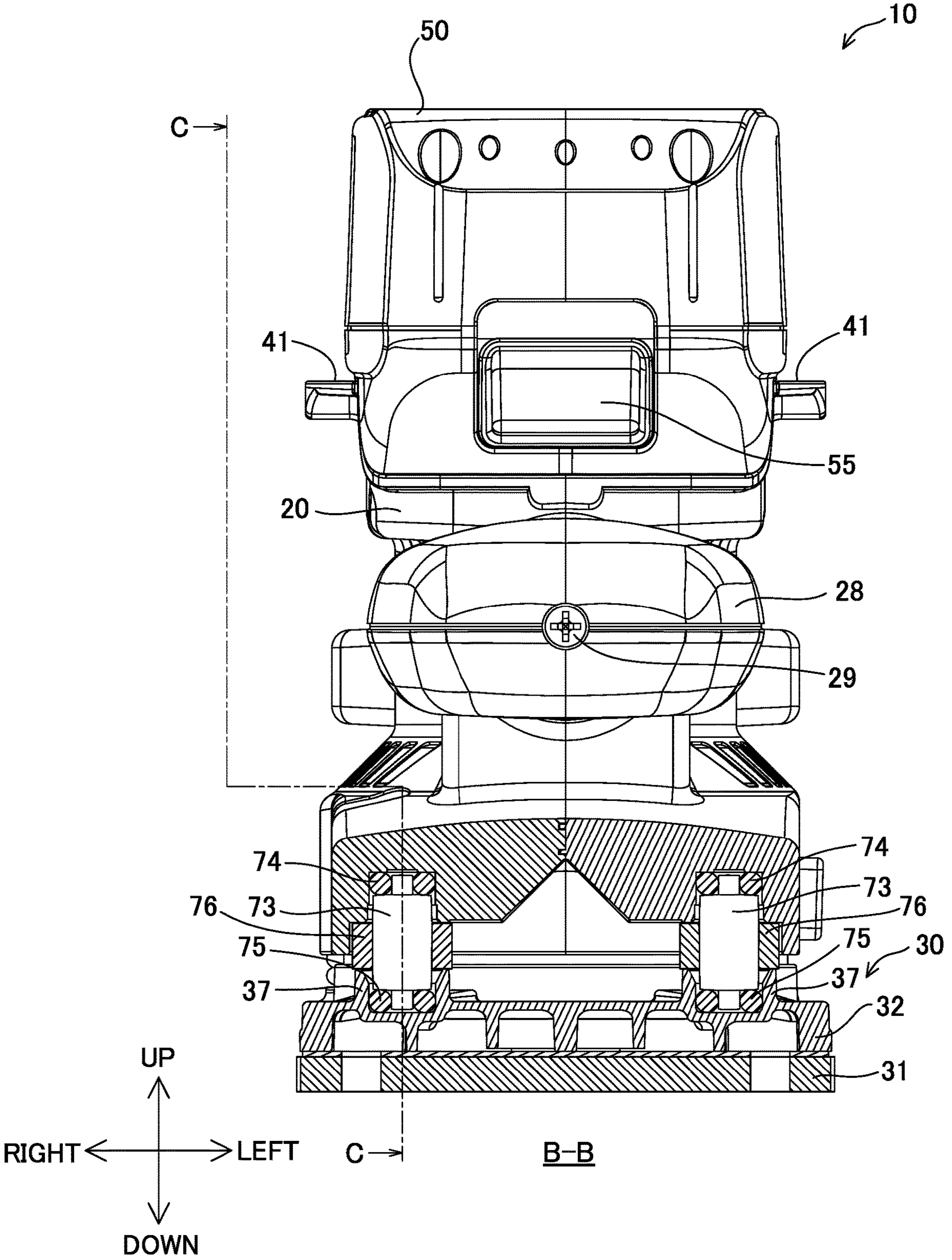
FIG. 9 is a longitudinal sectional view of the sander, taken along line B-B in FIG. 1.
Figure 10:
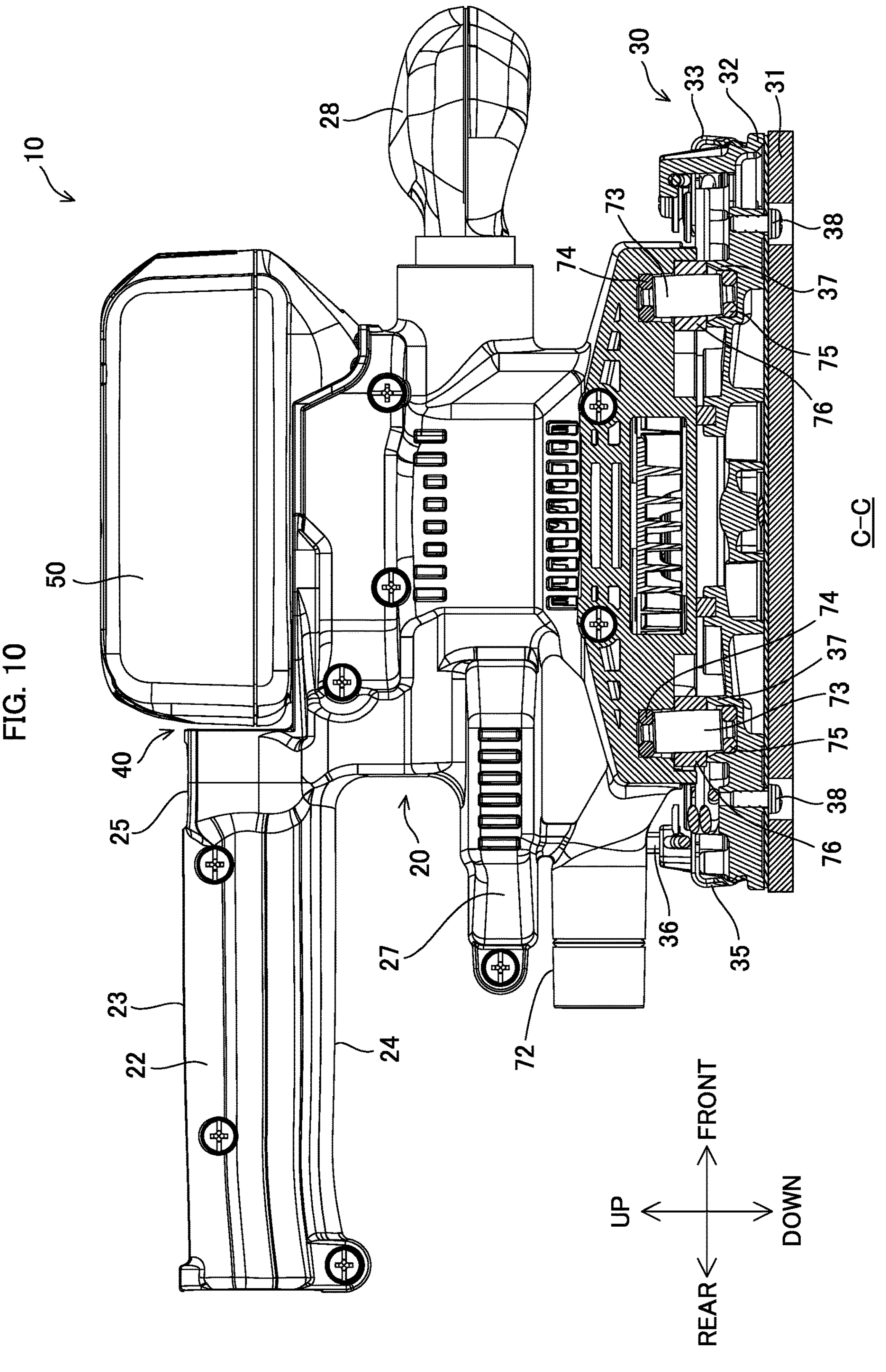
FIG. 10 is a longitudinal sectional view of the sander, taken along line C-C in FIG. 9.

As shown in FIGS. 9 and 10, the tool accessory 30 is further connected to the housing 20 via four feet 73. The feet 73 are respectively arranged near the four corners of the base 32, which is rectangular shaped. Each of the feet 73 has a generally cylindrical shape extending in the up-down direction. Each of the feet 73 includes small diameter upper and lower ends that have a smaller diameter than an intermediate or middle portion of each of the feet 73. An O-ring 74 is arranged around the upper small-diameter part of each of the feet 73 such that the four upper small-diameter parts are respectively engaged with the housing 20 via four of the O-rings 74. An O-ring 75 is arranged around the lower small-diameter part of each of the feet 73 such that the four lower small-diameter parts are respectively engaged with inner surfaces of four bosses 37 of the base 32 via four of the O-rings 75. Each of the feet 73 can be tilted relative to the up-down direction by compressing the respective O-rings 74, 75. A sleeve 76 is provided around each of the feet 73 so as to block or impede the ingress of dust. Each of the four sleeves 76 is formed of an elastic sponge material and is mounted in a slightly compressed state in the up-down direction, to provide an effective dust-proofing (dust-blocking or dust-impeding) measure for each of the feet 73.

As shown in FIGS. 2 and 3, the battery mounting part 40 is arranged in front of the first handle 22. The battery mounting part 40 is configured such that the battery 50 is slid and mounted thereon to serve as a power source of the electric motor 60.

Figure 4:
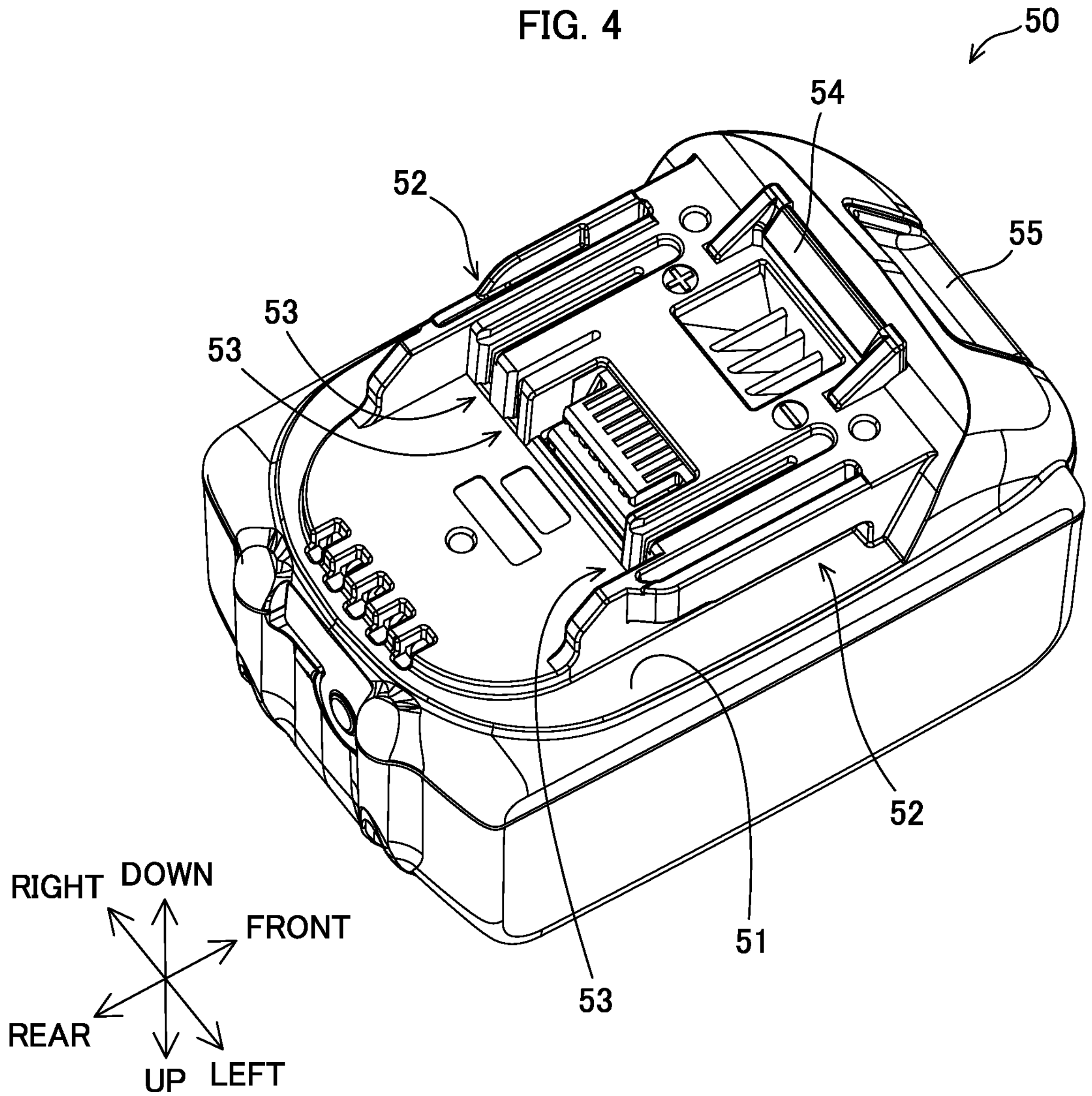
FIG. 4 is a perspective view of the battery.

As shown in FIG. 4, the battery 50, which is also known in the art as a battery pack or battery cartridge, has a generally rectangular shape. The directions shown in FIG. 4 indicate the directions of the battery 50 when mounted on the battery mounting part 40. The battery 50 has two guide grooves 52 and three terminal connecting grooves 53, which together serve as an example of an interface for connection (mechanical/physical and/or electrical connection) with the battery mounting part 40. The guide grooves 52 are respectively formed in (at, along) left and right lower edges of the battery 50. The guide grooves 52 extend in the front-rear direction so as to be open at the outer edge side in the left-right direction, and include a closed front end and an open rear end. The terminal connecting grooves 53 are formed (defined) between the two guide grooves 52. Each of the terminal connecting grooves 53 extends in the front-rear direction so as to be open on the lower side, and has a closed front end and an open rear end. Terminals (not shown) for electrical connection with terminals 43 (see FIGS. 3 and 5) of the battery mounting part 40 are respectively provided in the insides of each of the terminal connecting grooves 53.

The battery 50 further includes, as parts of the connection interface, an engagement part (latch or hook) 54 and a push button 55. The engagement part 54 protrudes downward from a bottom of the battery 50. The push button 55 is provided on (at) the front end of the battery 50. The engagement part 54 and the push button 55 are mechanically connected in the interior of the battery 50 and are configured such that the engagement part 54 retracts into the interior of the battery 50 when the push button 55 is depressed.

The battery 50 includes a mounting surface 51 on the side on which the above-described connection interface is located. In this embodiment, the battery 50 has a nominal rated voltage of 18 V, but it may have a larger or smaller rated voltage. The nominal rated voltage of the battery 50 may be, e.g., 14V-70V, e.g., 18V-40V.

In this embodiment, because the battery mounting part 40 for mounting the battery 50 has such a structure, the battery 50 is mountable thereon by sliding from the front to the rear. A sliding type mounting mechanism for the battery 50 is required to have a minimum length in the sliding direction so that the slide rails and guide rails can sufficiently engage. In this embodiment, because the sliding type mounting mechanism is configured such that the battery 50 is slid in the longitudinal direction (longest extension direction) of the tool accessory 30, the minimum length required for the sliding type mounting mechanism is easily ensured. In other words, it is not necessary to increase the device size (width) in the left-right direction only for the purpose of ensuring the required minimum length for slidably mounting the battery 50.

Figure 5:
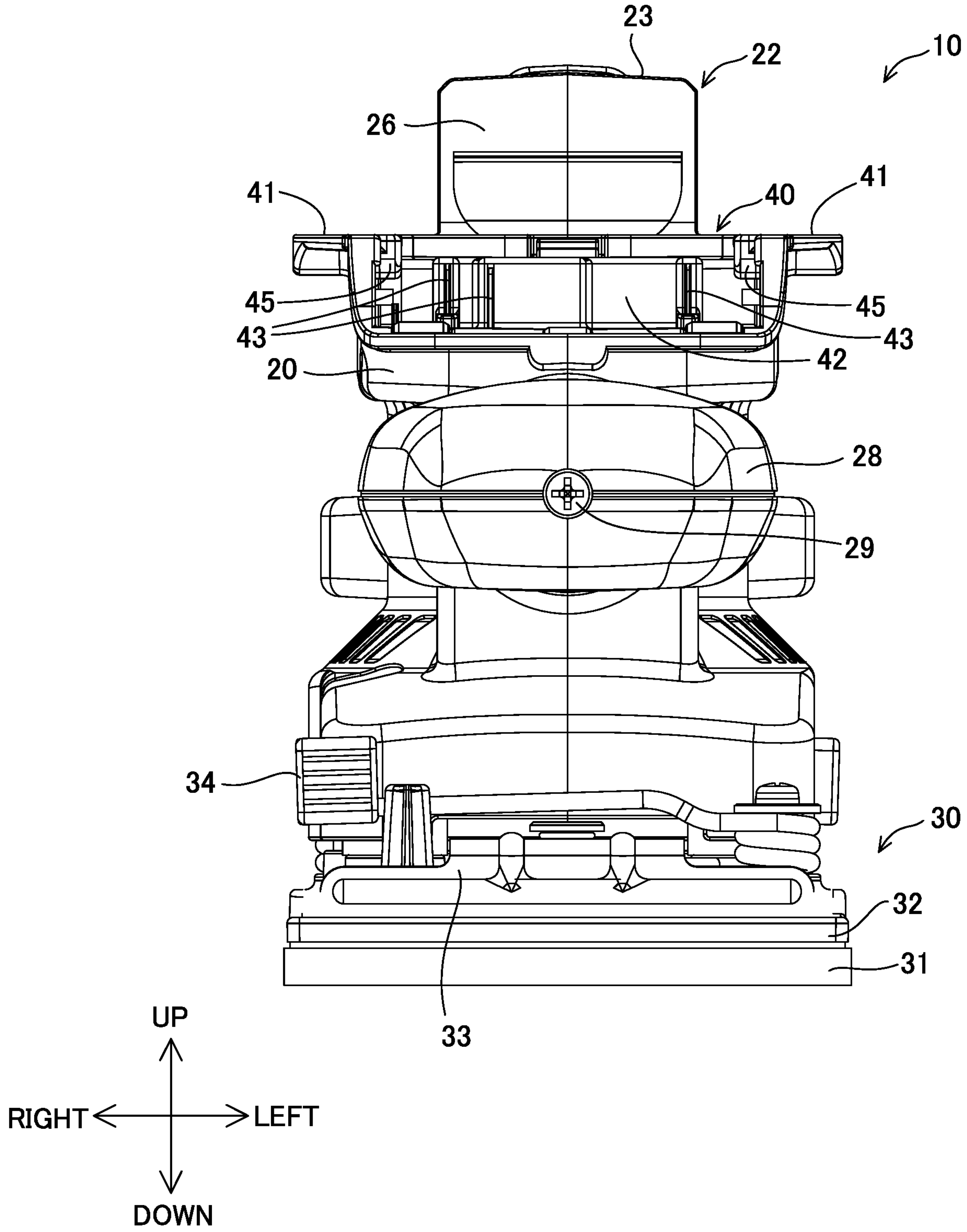
FIG. 5 is a front view of the sander with the battery detached therefrom.

As shown in FIGS. 3 and 5, the battery mounting part 40 includes a mounting surface (upward mounting surface) 41, a terminal base (terminal block) 42, three terminals 43 supported by (in, on) the terminal base 42, an engagement recess 44 and guide rails (slide rails) 45. The mounting surface 41 is an upward flat surface on which the battery 50 (more specifically, the mounting surface 51 of the battery 50) is mounted. In this embodiment, each of the mounting surface 41, the three terminals 43 (i.e. longitudinal extensions thereof) and the guide rails 45 (i.e. longitudinal extensions thereof) extends in a direction or plane that is at least substantially orthogonal to the up-down direction. Thus, the battery mounting part 40 is configured such that the battery 50 is mounted by sliding it in an at least substantially horizontal direction (at least substantially orthogonal to the up-down direction), preferably in the horizontal direction (orthogonal to the up-down direction and to the axial direction (rotational axis) of the motor shaft 61). As shown in FIG. 3, the mounting surface 41 has a generally U-shape that is closed at its rear end (closed at the front in the direction of sliding and mounting the battery 50) and is intersected by the rotational axis of the motor shaft 61.

As shown in FIG. 2, the mounting surface 41 is located in front of the first handle 22 in the front-rear direction, and below the upper side 23 of the first handle 22 in the up-down direction. More specifically, a stepped part is formed by a wall part 26 that extends in the up-down direction between the upper side 23 of the first handle 22 and the mounting surface 41.

As shown in FIGS. 3 and 5, the terminal base 42 is arranged inside of and below the mounting surface 41. The three terminals 43 are supported by the terminal base 42 and each as a longitudinal extension that extends in the front-rear direction within a plane defined by the front-direction and the left-right direction. Furthermore, the three terminals 43 are arranged at positions respectively corresponding to the three terminal connecting grooves 53 of the battery 50. Specifically, the three terminals 43 are arranged at positions so that they are respectively inserted into the three terminal connecting grooves 53 of the battery 50 when the battery 50 is being mounted onto the battery mounting part 40. Therefore, the terminals 43 become electrically connected to the battery 50 when the battery 50 has been mounted on the mounting surface 41.

As shown in FIG. 3, the engagement recess 44 is formed in the vicinity of a front end of the battery mounting part 40 and is partially recessed downward. As shown in FIG. 7, the engagement recess 44 receives the engagement part 54 when the battery 50 is mounted on the battery mounting part 40. This engagement prevents the battery 50 from becoming detached in the front-rear direction. The battery 50 is attached and detached by depressing the push button 55 so that the engagement part 54 is retracted into the inside of the battery 50 and thus no longer interferes (engages) with the engagement recess 44.

As shown in FIGS. 3 and 5, the guide rails 45 extend in the front-rear direction along left and right inner edges of the mounting surface 41. The guide rails 45 protrude inward in the left-right direction towards each other. As shown in FIG. 8, the guide rails 45 are respectively inserted into the guide grooves 52 of the battery 50 when the battery 50 is being mounted onto the battery mounting part 40. This engagement prevents the battery 50 from becoming detached in the up-down direction.

As shown in FIGS. 7 and 8, when the battery 50 has been mounted on the battery mounting part 40, the battery 50 is held entirely above the tool accessory 30 and entirely above the motor shaft 61. At this time, the motor shaft 61 is located near the center of the battery 50 when viewed from (in) the up-down direction. In other words, the longitudinal (rotational) axis of the motor shaft 61 passes between the guide rails 45 and between the two outermost terminals 43, as well as through approximately the center of the battery 50 in both the left-right direction and the front-rear direction.

As shown in FIG. 7, a controller 80 is housed within the housing 20. The controller 80 is electrically connected to the terminals 43 of the battery mounting part 40 and the electric motor 60 and controls operation (energization) of the electric motor 60 by controlling the amount of electric power (current) that is supplied from the battery 50 to the electric motor 60. In this embodiment, the controller 80 includes a high temperature protection circuit, an overcurrent protection circuit and an overdischarge protection circuit, but one or two of these protection circuits may be omitted.

As shown in FIG. 7, the controller 80 is located behind (rearward of) the motor shaft 61 (or, on the side on which first handle 22 is located) in the front-rear direction and below the first handle 22 in the up-down direction. The controller 80 is arranged such that its two largest surfaces respectively face upward and downward. Approximately a rear half portion of the controller 80 is housed within a controller housing part 27 that is formed to protrude rearward. In this arrangement, the controller 80 is arranged in a dead space (i.e. an empty or otherwise unused space) below the first handle 22, which means that the controller 80 is arranged at a position that does not significantly increase the overall size of the sander 10. Furthermore, by arranging (orienting) the controller 80 such that its two largest surfaces respectively face upward and downward, the amount of installation space required for the controller 80 in the up-down direction can be minimized. Therefore, a sufficient space is ensured between the first handle 22 and the controller housing part 27, so that the controller housing part 27 does not interfere with or hinder the user's ability to hold the first handle 22.

As shown in FIGS. 1 to 3, a switch (i.e. a motor control switch) 25 is provided on a base part (an upper front end) of the first handle 22. The switch 25 is electrically connected to the controller 80. The switch 25 is configured such that manual operation (e.g., pressing) of the switch 25 causes the electric motor 60 to start and stop. As shown in FIG. 3, the switch 25 includes a first button for stopping energization (driving) of the motor 60 and a second button for starting and setting the energization (driving) of the motor 60. More specifically, the rotational speed of the motor 60 is successively (sequentially) switched in a predetermined number of steps in a cycle every time the second button is pressed.

As shown in FIGS. 1 to 3, the sander 10 further includes a second handle 28. The second handle 28 may also be referred to as an auxiliary handle. In this embodiment, the second handle 28 has a generally egg-like shape, but it may have any shape that is suitable for grasping. To more stably hold and control movement of the sander 10 during a sanding operation, the user can hold the first handle 22 with one hand and the second handle 28 with the other hand. In this embodiment, the second handle 28 extends forward from the front end of the housing 20 beyond a front end of the tool accessory 30. Owing to this arrangement of the tool accessory 30 between the first handle 22 and the second handle 28, the user can easily apply a uniform downward pressing force to the tool accessory 30 from (at) the opposite (front and rear) sides during a sanding operation. Thus, it is easy to apply an evenly distributed pressing force against a workpiece with less burden on the user, to evenly sand the workpiece.

As shown in FIGS. 5 and 7, in this embodiment, the second handle 28 has a hole extending therethrough in the front-rear direction. The second handle 28 is fixed to the housing 20 by a bolt 29 being inserted into the hole and threadedly engaged with a threaded hole of the housing 20. Thus, the second handle 28 is detachable.

As shown in FIGS. 2 and 5, the second handle 28 is arranged below the battery mounting part 40 in the up-down direction. Therefore, the second handle 28 does not interfere with or hinder the sliding attachment and detachment of the battery 50 in the front-rear direction.

Figure 6:
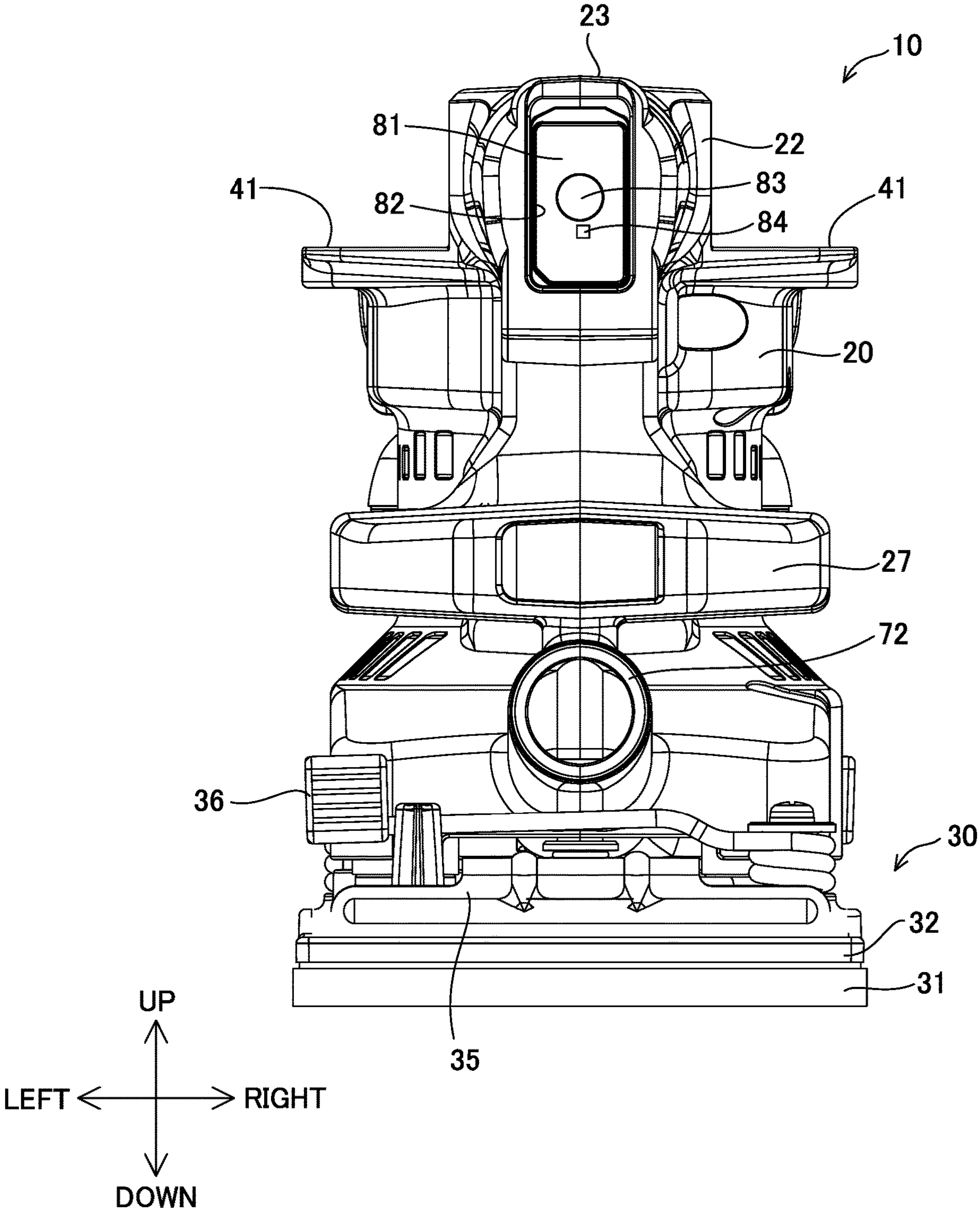
FIG. 6 is a rear view of the sander with the battery detached therefrom.

As shown in FIGS. 6 and 7, an adapter housing part 82 is provided in a rear end portion of the first handle 22. The adapter housing part 82 is formed to be recessed forward from a rear end opening. A wireless (radio or radiowave-based, e.g., Bluetooth®) communication adapter 81 is inserted and mounted in the adapter housing part 82. The wireless communication adapter 81 is electrically connected to the controller 80. The wireless communication adapter 81 wirelessly communicates with another auxiliary device, such as a dust collector (dust extractor or vacuum) for suctioning chips, dust and other debris. Starting and stopping of the auxiliary device is interlocked (coordinated) with starting and stopping of the sander 10 via wireless (radio) communication. In other words, when the user presses the first button of the switch 25 to start energization of the motor 60 of the sander 10, the auxiliary device (e.g., a dust extractor fluidly connected to the dust collecting nozzle 72) will also be automatically started so that the auxiliary device operates only when the sander 10 operates, thereby making the workpiece processing operation and the clean up operation more efficient. The wireless communication adapter 81 is paired for wireless communication with a wireless communication device (e.g., another adapter) provided (e.g., mounted) in the auxiliary device by pressing a button 83 of the wireless communication adapter 81 and a button of the wireless communication device of the auxiliary device. The button 83 is provided to start, for example, a WPS (Wi-Fi Protected Setup) function or an AOSS (AirStation One-touch Secure System) function. In the paired state, when the sander 10 is activated by turning on the switch 25, the start information is wirelessly transmitted from the wireless communication adapter 81 to the auxiliary device. The auxiliary device is activated based on a signal from the wireless communication adapter 81. A lamp 84 is provided on the wireless communication adapter 81 and turned ON to indicate that the wireless communication is enabled.

The above-described sander 10 operates as follows. First, when the user manually operates (e.g., presses) the switch 25 to drive (start energization of) the electric motor 60, the motor shaft 61 starts rotating. Since the eccentric bearing 64 that operably connects (couples) the motor shaft 61 and the tool accessory 30 is eccentric to the motor shaft 61, the tool accessory 30 undergoes orbital motion (eccentric circular motion) while compressing the O-rings 74, 75 arranged around the feet 73 and tilting the feet 73 as the motor shaft 61 rotates. More specifically, the tool accessory 30 moves in such a manner as to draw a circle along a horizontal plane while maintaining its attitude without rotating about the axial direction (rotational axis) of the motor shaft 61. In this state, when the bottom surface of the tool accessory 30 is pressed towards the workpiece, the eccentric circular (orbiting) motion of the sandpaper of the tool accessory 30 acts as an abrading motion, and the workpiece is sanded/abraded by the sandpaper attached to the bottom surface of the tool accessory 30.

Because the mounting surface 41 of the battery mounting part 40 is located below the upper side 23 of the first handle 22, a compact sander 10 in the up-down direction can be achieved, even with the battery 50 mounted thereon. Moreover, the sander 10 can be designed such that the battery 50 is slid and mounted from any of such directions without interference with or hindrance by the stepped part formed between the upper side 23 of the first handle 22 and the mounting surface 41 (or from any direction other than from the rear to the front). Consequently, a high degree of freedom of design is obtained for the sander 10. Thus, the sander 10 is easily designed such that the battery 50 is slid and mounted from such a direction as to prevent interference with other components of the sander 10, while reducing or minimizing the overall size of the sander 10 in the up-down direction. Furthermore, the battery mounting part 40 is configured such that the battery 50 is slid and mounted in an at least substantially horizontally direction. In other words, the battery 50 is preferably arranged in parallel, or substantially in parallel (e.g., within 30 degrees or less), to the horizontal direction. Therefore, the weight of the battery 50 acts downwardly on the sander 10 and is uniformly distributed in the horizontal direction, so that it becomes easier and less burdensome (tiring) on the user to achieve even sanding, polishing, grinding, etc.

Further, because the battery 50 is held above the vertically extending motor shaft 61, the size of the sander 10 in the up-down direction and the left-right direction can be reduced. Moreover, since the motor shaft 61 is located near the center of the tool accessory 30 when viewed from (in) the up-down direction, the relatively heavy battery 50 acts as a load (weight) around (over) the center of the tool accessory 30. Therefore, the pressing force of the tool accessory 30 against the workpiece is uniformly distributed in the horizontal direction.

Further, because the upper end of the motor shaft 61 is located below the lower side 24 of the first handle 22 in the up-down direction, the size of the sander 10 in the up-down direction can be reduced for this reason as well. Moreover, because a brushless motor is used as the electric motor 60 in the above-described embodiment, the length of the motor shaft 61 can be reduced as compared to a brushed motor. Therefore, it is easy to design the sander 10 so that the upper end of the motor shaft 61 is arranged below the lower side 24 of the first handle 22.

Although a particular embodiment of the present disclosure is described in detail above in detail for explanation and illustrative purposes, this embodiment is merely intended to facilitate a good understanding of the present teachings and should not be interpreted as restricting the scope of the invention. The present invention may be changed or modified without departing from its spirit and includes its equivalents. Further, any combination or omission of elements described in the claims and the specification may be made within a range in which, e.g., at least part of the above-described problem(s) can be solved or within a range in which, e.g., at least part of the above-described effect(s) can be obtained.

For example, the sliding direction of the battery 50 may be changed owing to the fact that the sander 10 has a high degree of freedom of design for the sliding attachment of the battery 50 as described above. For example, the battery mounting part 40 may be configured such that the battery 50 is attached and detached by sliding in the left-right direction. In such an embodiment, the battery 50 can be attached and detached even if the second handle 28 is provided above the battery mounting part 40. Further, the sliding direction of the battery 50 is not limited to the horizontal direction, and it may be, for example, any direction within 30 degrees (within a range of plus/minus 30 degrees) relative to the horizontal direction or more preferably within 20 degrees thereof, even more preferably within 10 degrees thereof. In this manner, it is easy to design the sander 10 such that the battery 50 is slid and mounted from such a direction as to prevent interference with other components of the sander 10, while avoiding an increase in size of the sander 10 in the up-down direction. Furthermore, the sliding direction of the battery 50 may be set to any direction. For example, it may be the up-down direction. In this case, it is still possible to avoid an increase in size of the sander 10 in the up-down direction.

Figure 11:
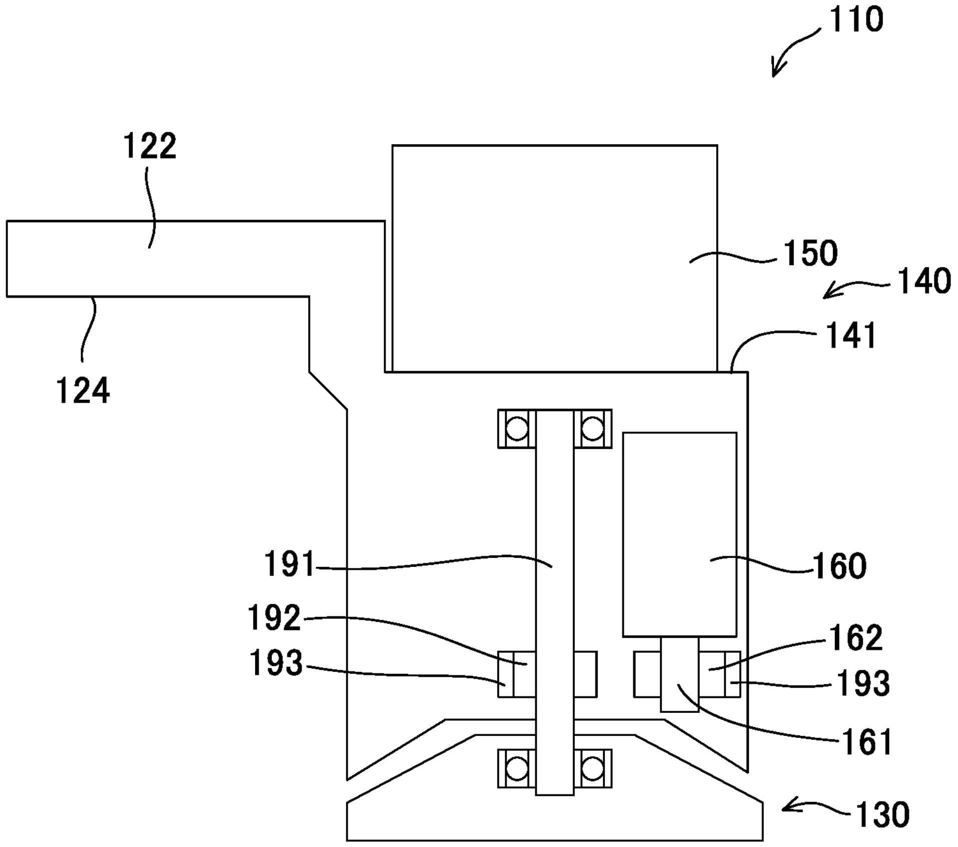
FIG. 11 is a schematic diagram showing a sander having an output shaft arranged in parallel to a motor shaft according to another non-limiting embodiment of the present disclosure.

Further, the sander optionally may include an output shaft (spindle) as described, for example, in WO2018/168421, which is incorporated herein by reference. FIG. 11 shows such type of sander 110 according to one embodiment. An output shaft 191 is arranged in parallel to a motor shaft 161 of a motor 160 and is configured to transmit the rotational driving force of the motor shaft 161 to the tool accessory 130 via a pulley 162 fixed around the motor shaft, a pulley 192 fixed around the output shaft 191, and an endless belt looped around the pulleys 192 and 193. A battery mounting part 140 having a mounting surface (upward mounting surface) 141 is configured to hold a battery 150 entirely above the output shaft 191. The upper end of the output shaft 191 is arranged below a lower side 124 of a first handle 122 in the up-down direction. With such a structure, the same effect as the above-described embodiment can also be obtained.

Moreover, the present teachings, as applied above to the above-described embodiment, are not limited to orbital sanders, but also may be advantageously applied to any type of portable or hand-held power tool having an elongated handle and a battery. For example, the present teachings may be readily applied to a random orbital sander or a polisher.

As used herein, the term "tool accessory" is intended to encompass or be, without limitation, a pad or plate designed to detachably hold sandpaper (e.g., abrasive disks or rectangular abrasive papers), a polishing material such as a sponge pad, a felt pad, a wool pad, a bonnet, etc., by using, e.g., clamps, clips, hook-and-loop type fasteners, etc., as well as other types of accessories or attachments that may be integrally attached to a device (e.g., a splined collar, a lock nut, etc.) designed to detachably attach the accessory or attachment to the output shaft (spindle), such as a disk (e.g., a grinding disk), an integrated polishing pad or abrasive pad, a wire wheel, a wire brush, a nylon wheel, a nylon brush, etc.

Although some aspects of the present disclosure have been described in the context of a device, it is to be understood that these aspects also represent a description of a corresponding method, so that each block, part or component of a device, such as the controller 80, is also understood as a corresponding method step or as a feature of a method step. In an analogous manner, aspects which have been described in the context of or as a method step also represent a description of a corresponding block, part, detail, algorithm or feature of a corresponding device, such as the controller 80.

Depending on certain implementation requirements, exemplary embodiments of the controller 80 of the present disclosure may be implemented in hardware and/or in software. The implementation can be configured using a digital storage medium (non-transitory computer-readable medium), for example one or more of a ROM, a PROM, an EPROM, an EEPROM or a flash memory, on which electronically readable control signals (program code-computer-readable instructions) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA), as well as a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 80, are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes in the controller 80.

Therefore, although some aspects of the controller 80 may have been identified as "parts" or "steps", it is understood that such parts or steps need not be physically separate or distinct electrical components, but rather may be different blocks of program code that are executed by the same hardware component, e.g., one or more microprocessors.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

10: sander, 20: housing, 20*a*: right housing, 20*b*: left housing, 21: bolt, 22: first handle, 23: upper side of the first handle, 24: lower side of the first handle, 25: switch, 26: wall part, 27: controller housing part, 28: second handle, 29: bolt, 30: tool accessory, 31: pad, 32: base, 33, 35: damper, 34, 36: lever, 37: boss, 38: bolt, 40: battery mounting part, 41: mounting surface, 42: terminal base, 43: terminal, 44: engagement recess, 45: guide rail, 50: battery, 51: mounting surface, 52: guide groove, 53: terminal connection groove, 54: engagement part, 55: push button, 60: electric motor, 61: motor shaft, 62, 63, 64: bearing, 65: balancer, 66: bolt, 71: fan, 72: dust collecting nozzle, 73: foot, 74, 75: O-ring, 76: sleeve, 80: controller

The invention claimed is:

1. A portable power tool, comprising:

a first handle extending in an elongated manner and configured to be held by a user;

an electric motor;

a tool accessory configured to undergo an orbital and/or rotational motion in response to generation of a rotational driving force by the electric motor; and a battery mounting part configured to be detachably attached to a battery that serves as a power source for the electric motor, wherein:

an extension direction of the first handle is defined as a front-rear direction of the power tool, a direction orthogonal to the front-rear direction is defined as an up-down direction, the first handle and the tool accessory being arranged in series in the up-down direction, in the up-down direction, a first side of the power tool on which the first handle is located is defined as an upper side, and a second, opposite side of the power tool on which the tool accessory is located is defined as a lower side, the battery mounting part includes an upward mounting surface on which the battery is mountable, and at least one terminal configured to be electrically connected to the battery in response to a surface of the battery that includes a connection interface being placed on the mounting surface, the battery mounting part is configured such that, when the battery is mounted on the battery mounting part, the battery is disposed entirely above the electric motor in the up-down direction, and the upward mounting surface is located at a position different from the first handle such that the upward mounting surface and the first handle do not overlap in the front-rear direction, and is located below an upper side of the first handle in the up-down direction.

2. The portable power tool according to claim 1, wherein the battery mounting part is configured such that the battery is mountable by sliding in a direction that forms an angle of 30 degrees or less with a horizontal direction that is orthogonal to the up-down direction.

3. The portable power tool according to claim 1, wherein the battery mounting part is configured such that the battery is mountable in a direction that forms an angle of 10 degrees or less with a horizontal direction that is orthogonal to the up-down direction.

4. The portable power tool according to claim 1, wherein:

the electric motor includes a motor shaft extending in the up-down direction, and the battery mounting part is configured to hold the battery entirely above the tool accessory and entirely above the motor shaft in the up-down direction such that a rotational axis of the motor shaft intersects the upward mounting surface.

5. The portable power tool according to claim 4, wherein an upper end of the motor shaft is located below a lower side of the first handle in the up-down direction.

6. The portable power tool according to claim 4, wherein:

the electric motor is a brushless motor, the at least one terminal comprises two parallel terminals each having a longest extension that extends in the front-rear direction, and the rotational axis passes between the two parallel terminals.

7. The portable power tool according to claim 4, further comprising:

an output shaft arranged in parallel to the motor shaft and configured to transmit the rotational driving force generated by the motor shaft to the tool accessory, wherein:

the battery mounting part is configured to hold the battery entirely above the output shaft, and an upper end of the output shaft is located below a lower side of the first handle in the up-down direction.

8. The portable power tool according to claim 4, further comprising a controller configured to control operation of the electric motor, wherein the controller is located on a first lateral side of the power tool on which the first handle is located with respect to the motor shaft in the front-rear direction, and is located below the first handle in the up-down direction.

9. The portable power tool according to claim 8, wherein the controller has two largest surfaces that respectively face upward and downward in the up-down direction.

10. The portable power tool according to claim 1, further comprising:

a second handle arranged below the battery mounting part in the up-down direction.

11. A portable power tool, comprising:

a first handle extending in an elongated manner and configured to be held by a user;

an electric motor having a motor shaft that extends in an up-down direction and that is rotatable about a rotational axis;

a tool accessory configured to undergo an orbital and/or rotational motion in response to generation of a rotational driving force by the electric motor; and a battery mounting part configured to be detachably attached to a battery that serves as a power source for the electric motor, wherein:

an extension direction of the first handle is defined as a front-rear direction of the power tool, the up-down direction is orthogonal to the front-rear direction, and the first handle and the tool accessory are arranged in series in the up-down direction, in the up-down direction, a first side of the power tool on which the first handle is located is defined as an upper side, and a second, opposite side of the power tool on which the tool accessory is located is defined as a lower side, the battery mounting part includes an upward mounting surface on which the battery is mountable, two guide rails configured to physically connect to the battery, and at least two terminals configured to be electrically connected to the battery in response to a surface of the battery that includes a connection interface being placed on the mounting surface, the at least two terminals extend in a plane defined by the front-rear direction and a left-right direction that is perpendicular to the front-rear direction and perpendicular to the up-down direction, the plane being entirely above the electric motor in the up-down direction;

the two guide rails extend in the plane or in parallel to the plane;

the rotational axis of the motor shaft extends between the two guide rails and also between the at least two terminals;

the mounting surface is located at a position different from the first handle in the front-rear direction, and is located below an upper side of the first handle in the up-down direction, a second handle arranged below the battery mounting part in the up-down direction, the tool accessory has a generally rectangular shape, and a longitudinal direction of the generally rectangular shape extends in the front-rear direction when viewed in the up-down direction, and in the front-rear direction, a first lateral side of the power tool on which the battery mounting part is located is defined as a front side, a second, opposite lateral side of the power tool on which the first handle is located is defined as a rear side, and the battery mounting part is configured such that the battery is mountable by sliding it from the front to the rear in the front-rear direction.

12. The portable power tool according to claim 1, further comprising the battery mounted on the battery mounting part, wherein a longitudinal axis of the first handle intersects the battery.

13. The portable power tool according to claim 6, wherein the battery mounting part is configured such that the battery is mountable in a direction that forms an angle of 10 degrees or less with a horizontal direction that is orthogonal to the up-down direction.

14. The portable power tool according to claim 13, further comprising a controller configured to control operation of the electric motor, wherein the controller is located on a first lateral side of the power tool on which the first handle is located with respect to the motor shaft in the front-rear direction, and is located below the first handle in the up-down direction.

15. The portable power tool according to claim 14, wherein the controller has two largest surfaces that respectively face upward and downward in the up-down direction.

16. The portable power tool according to claim 15, wherein:

the tool accessory has a generally rectangular shape, and a longitudinal direction of the generally rectangular shape extends in the front-rear direction when viewed in the up-down direction, and the battery mounting part is configured such that the battery is mountable by sliding it from the front to the rear in the front-rear direction.

17. The portable power tool according to claim 16, further comprising:

a second handle arranged below the battery mounting part in the up-down direction; and the battery attached to the battery mounting part.

18. A hand-held power tool, comprising:

an elongated handle having a longitudinal axis extending in a front-rear direction of the power tool;

an electric motor having a motor shaft that extends in an up-down direction of the power tool that is orthogonal to the front-rear direction, the motor shaft being rotatable about a rotational axis;

a tool accessory operably coupled to the motor shaft of the electric motor and disposed below the elongated handle and the electric motor in the up-down direction; and a battery mounting part having a mounting surface that faces at least substantially upward in the up-down direction, the mounting surface being configured to detachably mount a battery that supplies current to the electric motor via at least one terminal, wherein:

the rotational axis intersects the mounting surface, and the mounting surface is spaced apart from and does not overlap the elongated handle in the front-rear direction and is located below an upper side of the elongated handle in the up-down direction.

19. The hand-held power tool according to claim 18, wherein the battery mounting part is configured such that the battery is slidably mountable in a direction that forms an angle of 10 degrees or less with a horizontal direction that is orthogonal to the up-down direction.

20. The hand-held power tool according to claim 19, wherein:

the battery mounting part is configured to hold the battery entirely above the tool accessory and entirely above the motor shaft in the up-down direction, and an upper end of the motor shaft is located below a lower side of the elongated handle in the up-down direction and below the mounting surface in the up-down direction.

21. The portable power tool according to claim 1, wherein:

the battery mounting part is configured such that the battery is mountable by sliding it from the front to the rear in the front-rear direction.

22. The portable power tool according to claim 21, wherein:

the battery mounting part has two guide rails configured to engage the battery, each of two guide rails has a longest length that extends in the front-rear direction, and a rotational axis of a motor shaft of the electric motor passes between the two guide rails.

23. The portable power tool according to claim 22, further comprising:

the battery mounted on the battery mounting part, wherein a longitudinal axis of the first handle intersects the battery.

24. The portable power tool according to claim 23, wherein:

the motor shaft extends in the up-down direction, the battery mounting part is configured to hold the battery entirely above the tool accessory and entirely above the motor shaft in the up-down direction, an output shaft is arranged in parallel to the motor shaft and configured to transmit the rotational driving force generated by the electric motor as orbital motion to the tool accessory, the battery mounting part is configured to hold the battery entirely above the output shaft, and an upper end of the output shaft is located below a lower side of the first handle in the up-down direction.

25. The portable power tool according to claim 24, wherein:

the portable power tool is an orbital sander, the tool accessory includes a pad or plate configured to detachably hold sandpaper or polishing material, and the pad or plate is attached to the output shaft and is configured to undergo orbital motion in response to generation of the rotational driving force by the electric motor.

* * * * *